United States Patent

[11] 3,618,653

[72] Inventor Peter M. Stellas
 617 3rd Ave., W., Seattle, Wash. 98119
[21] Appl. No. 875,449
[22] Filed Nov. 10, 1969
[45] Patented Nov. 9, 1971

[54] TRACTION CHAIN DEVICE
 9 Claims, 8 Drawing Figs.
[52] U.S. Cl. .................................................. 152/213 A
[51] Int. Cl. ..................................................... B60c 27/10
[50] Field of Search .......................................... 152/213,
 213 A

[56] References Cited
 UNITED STATES PATENTS
 2,249,665  7/1941  Oakes............................ 152/213
 2,655,972  10/1953  Poney........................... 152/213

Primary Examiner—James B. Marbert
Attorney—Christensen & Sanborn

ABSTRACT: An apparatus for applying and securing a vehicle traction chain is described. A first substantially U-shaped clip member constructed of a material having spring-type characteristics is adapted to engage each of the sidewalls of an automobile tire and is connected to one end of a traction chain. As the vehicle tire is rotated, the traction chain apparatus is emplaced into operative position about the tire. When the tire has rotated approximately 360°, a second substantially U-shaped member attached to the second end of the traction chain is caused to engage pivot studs outstanding from the first U-shaped member. The second U-shaped member is then rotated about the studs into operative position against the tire tread and secured by an overcenter latch arrangement and locking means.

PATENTED NOV 9 1971 3,618,653

INVENTOR
PETER M. STELLAS
BY Christensen, Sanborn
& Matthews
ATTORNEYS

PATENTED NOV 9 1971 3,618,653

INVENTOR
PETER M. STELLAS
BY Christensen, Sanborn
& Matthews
ATTORNEYS 3,618,653

TRACTION CHAIN DEVICE

BACKGROUND OF THE INVENTION

This invention relates to apparatus for applying traction chains to the driving wheels of a vehicle and securing the traction chains to the vehicle tires. This invention further relates to a method of applying traction chains to vehicle tires whereby it is unnecessary to raise the vehicle tires from the ground to apply the traction chains. In addition, this invention relates to means for applying traction chains to vehicle tires wherein the means to apply the chains to the tires and the means to secure the traction chains in their operative position are one and the same.

Placing chains on the driving wheels of an automotive vehicle to provide additional traction on snowy or icy roads has heretofore been a nuisance and a rather unpleasant task. Frequently it is necessary to raise the tire of the vehicle to apply and fasten the chain. When this is done the inside attaching means is still relatively inaccessible so that the person applying the chains usually has to crawl under the vehicle to achieve the attachment. Manipulation of the small chain-fastening elements of the prior art is difficult at best under cold, wet and snowy conditions. One prior art solution to this problem is to attach one end of the chain to the tire with a springlike member which engages the sidewalls of the tire permitting the driver to advance the car on the road rolling the tire chains about the tire into their operative position. This procedure eliminates the need to raise the vehicle tire from the pavement; however, the inside fastening means is even more inaccessible than when the wheel is raised from the ground. Other springlike fasteners, chain stretchers and the like have been proposed in the prior art but no solution to the problems of initial application of the traction chain to the tire and inaccessibility of the interior fastening means has been achieved.

It is an object of this invention to provide means for applying traction chains to vehicle tires wherein the vehicle need not be raised from the pavement in order to apply the chains to the tire. It is a further object of this invention to provide securing means operative with the means for applying the traction chains to the tire which obviates the necessity of manual manipulation of fastening means at the relatively inaccessible securing point on the inside of the tire.

An important object of this invention is to provide rapid and convenient means for applying and securing traction chains to vehicle tires. A related object of this invention is to provide means for securing traction chains to automobile tires which eliminates the locking mechanism usually associated with traction chains and provides a securing means operable from a single readily accessible position on the circumference on the circumference of the tire.

SUMMARY OF THE INVENTION

This invention provides means for attaching and securing traction chains to vehicle tires including a first U-shaped member attached to one end of a traction chain and a second U-shaped member attached to the other end of the traction chain. The first U-shaped member is constructed and arranged to fit over the tire such that the U-shaped member will firmly engage the sidewalls thereof. Upon forward motion of the vehicle in an amount sufficient to provide approximately 360° rotation of the tire, the chain will be emplaced about the vehicle tire in its operative position. When this rotation is completed the second U-shaped member is manipulated to engage pivot means attached to each side of the first U-shaped member and rotated into its operative position. As a result, the chain is tightly stretched and bound to the vehicle tire. The latch comprises an overcenter-type fastener which forces the U-shaped portion of the second U-shaped member into contact with the tire tread and securely fastens the chain in its operative position. Additional positive latch means may be provided to prevent accidental dismantling of the chain fastener at high speeds.

These and other objects, advantages and attributes of this invention will be more thoroughly understood through a detailed evaluation of the following description of the preferred embodiment of this invention with reference to the attached drawings. In the drawings.

Figure 1:
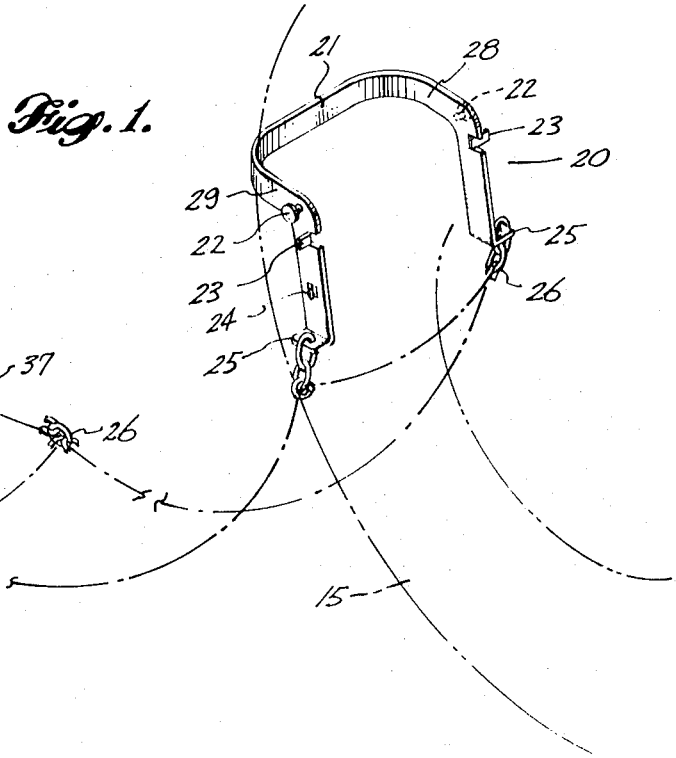
FIG. 1 shows a perspective view of one embodiment of this invention being emplaced upon a vehicle tire.

Referring more particularly to the drawings wherein like numerals indicate like parts, there is seen in FIG. 1 a traction chain device comprising a first U-shaped clamp 20 and a second U-shaped clamp 30 attached at each end of a tire traction chain 26. The first U-shaped clamp member 20 has a tread engaging portion 21 and sidewall engaging members 28 and 29. The clamp member 20 is formed in a generally U-shaped form such that when emplaced about a vehicle tire, the sidewall engaging members 28 and 29 will firmly grip the sidewalls of the tire to maintain the U-shaped member 20 in its tire engaging position while the chain is being drawn about the vehicle tire. The U-shaped member 20 carries a pair of pivot axles 22 engageable by the second U-shaped member 30. A pair of chain arresters 23 are also provided on U-shaped member 20 and function to keep U-shaped member 20 from being pulled away from the tread by centrifugal force of tire rotation. A latch member 24 is provided on U-shaped member 20 to engage the second element of this invention and securely hold it in position on the vehicle tire. Chain attaching ears 25 are provided on each side of the U-shaped member onto which the traction chain 26 is attached.

The second element of this invention is generally indicated by the numeral 30 and comprises a tread engaging member 31 and sidewall encircling members 41 and 42. Sidewall encircling members 41 and 42 each carry a chain mounting member 33 onto which the second end of traction chain 26 is attached. A pivot axle engaging means 32 attached to each of the sidewall encircling members 41 and 42 extends substantially parallel to the sidewall of the tire and has a recess 37 for engaging the pivot axle. Sidewall encircling member 42 has in one section thereof an aperture 34 for engaging the locking ear 24 cut into U-shaped member 20.

Figure 2:
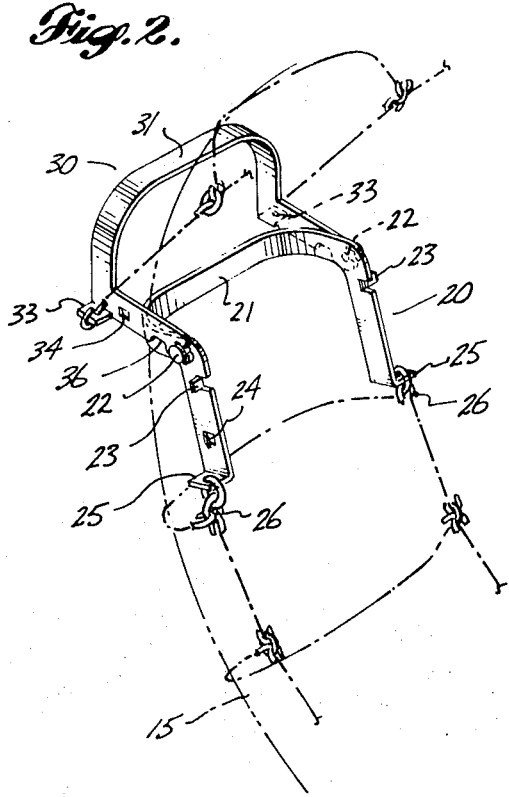
FIG. 2 shows a perspective view of the device shown in FIG. 1 after rotation of the vehicle tire through approximately 360°.
Figure 3:
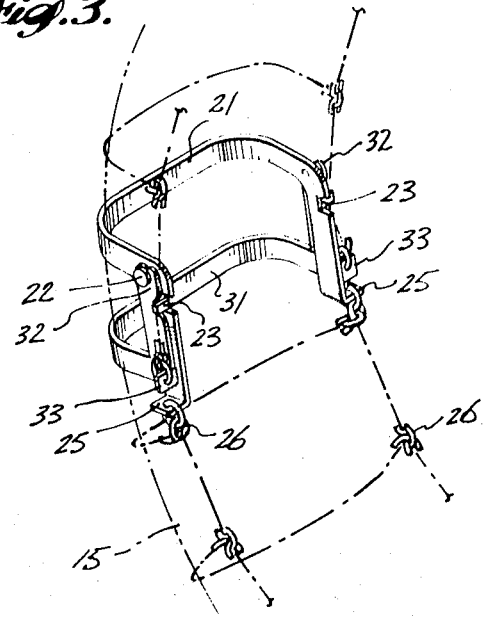
FIG. 3 shows a perspective view of the apparatus shown in FIG. 1 in operative position securing a traction chain about a vehicle tire.
Figure 4:
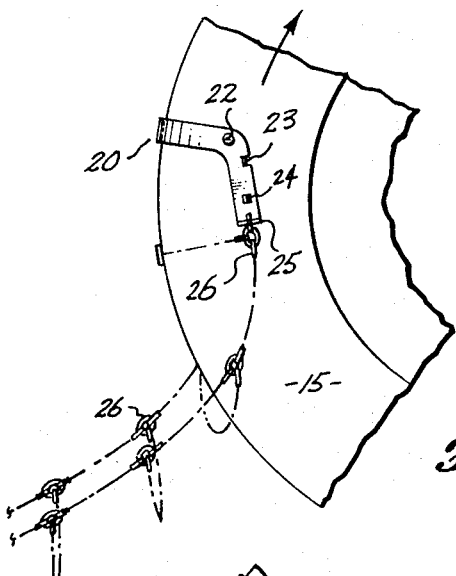
FIG. 4 shows a side view of one element of this invention applied to the tread and sidewall of a tire.
Figure 5:
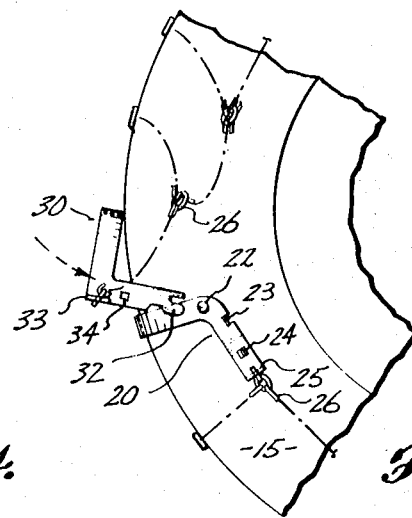
FIG. 5 shows a side view of two of the elements of this invention being used to stretch and emplace a vehicle traction chain about a vehicle tire.

In FIG. 2 the two U-shaped members of this invention are shown with the axle engaging slot 37 in contact with pivot axle 22 prior to rotation of U-shaped member 30 into its operative position. In FIG. 3, U-shaped member 30 has been rotated into its operative position, thus tightening chain 26 and causing the chain to assume its operative position about the vehicle tire. The structure of the two U-shaped members 20 and 30 is such that rotation of U-shaped member 30 about the pivot axles 22 results in an overcenter latch arrangement, the rotation of which is halted by engagement of the tire tread by tread engaging member 31. Tension on chain 26 usually will be adequate to hold the locking device in its operative position. However, the locking apparatus described above, including locking ear 24 and aperture 34 is provided to insure the secure fastening of the device to prevent unlocking at high speeds. In FIGS. 4–7 side views of the device being assembled about a vehicle tire are presented.

Figure 6:
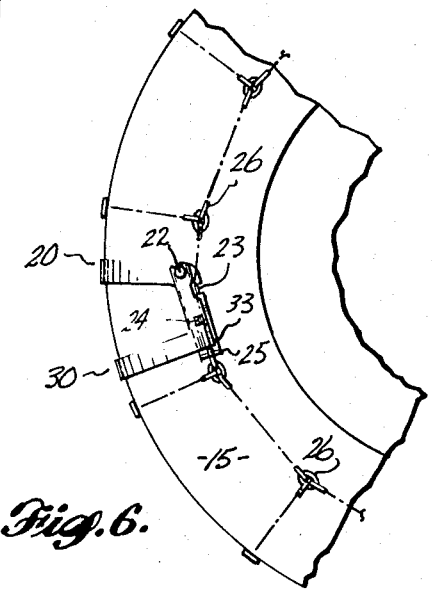
FIG. 6 is a side view of the device of this invention in operative position about a vehicle tire.
Figure 7:
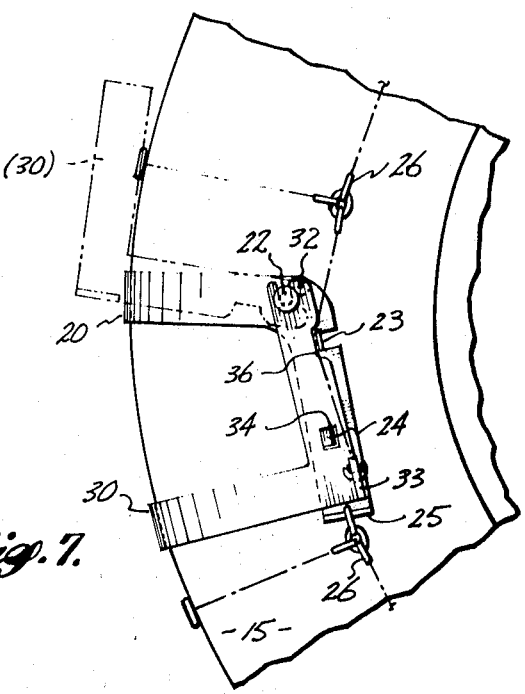
FIG. 7 is an enlarged view of the apparatus shown in FIG. 6, showing the various parts of the invention and the cooperation therebetween.

To use the apparatus of this invention, the U-shaped clamp 20 is emplaced about the tire of an automobile or similar wheeled vehicle such that the tread engaging portion 21 engages the load bearing surface of the tire. The sidewall engaging members 28 and 29 clamp on sidewalls of the tire to secure U-shaped member 20 to the edges of the tire by frictional contact. The vehicle is then moved forward such that the wheel rotates through approximately 360°. The U-shaped member 20 maintains its position on the tire and causes the chain 26 to be pulled about the tire and emplaced into its operative position. However, at this stage it is merely draped about the tire. The pivot axle engaging means 32 are then forced into engagement with the pivot axles by manipulating the U-shaped member 30. The U-shaped member 30 is then rotated downwardly toward the tire tread until the traction chain 26 is pulled into its operative position with a resulting tension being placed on the chain to maintain the chain securely fastened about the tire. At this point in the rotation of U-shaped member 30 an overcenter latch arrangement is obtained as shown in FIGS. 6 and 7. As U-shaped member 30 is rotated further the forces caused by tension upon chain 26 encourage further rotation of U-shaped member 30 until tread engaging segment 31 engages the tread of the tire 15. In this condition, shown in FIGS. 6 and 7, both of the U-shaped members 20 and 30 are securely fastened against the tire tread and are secured together to prevent relative rotation therebetween. Locking means comprising locking ear 24 and aperture 34 secure the two U-shaped members together to prevent accidental dismantling of the chain fastening mechanism when the tire is rotated at high speed. Ear 24 protrudes from U-shaped member 20 to engage aperture 34 which is cut out of a corresponding section of U-shaped member 30 to form the locking means. When the two U-shaped members 20 and 30 are engaged in their operative position as shown in FIGS. 3, 6 and 7, the aperture 34 is engaged by ear 24 to prevent relative rotation between the two U-shaped members.

It is readily seen from the foregoing that application of a vehicle tire traction chain device may be efficiently accomplished by use of the apparatus of this invention. It is necessary only to emplace the first U-shaped member about the sidewalls of the tire, rotate the tire through approximately 360° and engage the pivot point of the first U-shaped member with the slotted recess of the second member and rotate the second U-shaped member into position. There is no need to crawl underneath the vehicle to operate the inside chain fastener. The entire operation can be done from the outside without raising the vehicle on a jack or similar apparatus.

Removal of the chain apparatus from the vehicle tire is easily accomplished by disengaging the locking mechanism and rotating the second U-shaped member 30 to disengage the slot 37 from pivot axle 22. To disengage the locking mechanism the U-shaped member 30 is separated from U-shaped member 20 by pulling the sidewall encircling member 40 outwardly away from the tire sidewall. This releases locking ear 24 from aperture 34. The U-shaped member 30 may then be rotated to disengage slot 37 from pivot axles 22. Rotation of the vehicle tire through approximately 360° in the direction opposite to that used to apply the chains to the tire will permit removal of the traction chain from the tire. The first U-shaped unit 20 may then be removed from its engagement with the sidewalls of the tires and the chain retrieved from its position on the ground for storage within the vehicle. However, it is not necessary to rotate the wheel through 360° when removing the chain. By disengaging both brackets, the chain can be undraped from the tire and pulled to the ground on the outer side of the tire. Only a portion of the chain will be inaccessible, at the point of contact between the tire and the ground. The vehicle may then be moved a short distance forward or back to release the traction chain.

Figure 8:
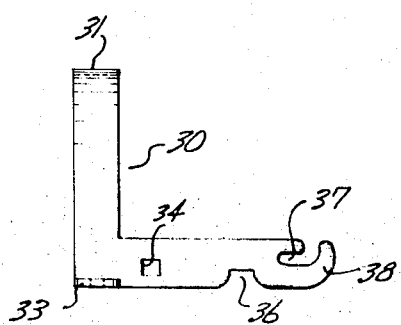
FIG. 8 is a side view of a second embodiment of this invention.

The preferred embodiment discussed above is included here by way of example and is not intended to be an indication of the scope of this invention. Many modifications and alterations to this invention will be readily apparent to one skilled in the art and are considered to be within the scope and spirit of this invention. One of the many possible modifications which are readily apparent to one skilled in the art is shown in FIG. 8. In this embodiment the pivot engaging member 32 has been formed into a hooklike member 38 to aid in proper engagement of the U-shaped member 30 with the pivot means 22 of U-shaped member 20. The slot 37 into which the pivots are placed is constructed and arranged to more easily engage the pin 22. Pin 22 is readily engaged by simple manipulation of the U-shaped member 30 aided by the hooklike projection 38.

Adjustment means for changing the circumferential length of the tire chain may also be provided as a modification to this invention. Examples of suitable adjustment means which are well known to the art would include hook members adapted to engage any one of the chain links as desired to alter the chain length; turnbuckle type adjusters, multiple position overcenter latches or other equivalent adjustment means. Use of an adjustment means will ensure the correct circumferential length of chain 26 to provide the proper tension on the chain when in use on a vehicle tire.

While the present invention has been described with particular reference to the specific examples, it will be apparent to those skilled in the art that various changes and modifications may be made thereto.

What is claimed is:

1. Apparatus for applying and securing a traction chain to a vehicle tire comprising:
    a first U-shaped member attached to one end of said traction chain, said first U-shaped member comprising a tread engaging element, a pair of sidewall engaging elements attached thereto and a pivot axle extending outwardly from each of said sidewall engaging elements said first U-shaped member constructed and arranged to frictionally engage the sidewalls of said vehicle tire, and
    a second U-shaped member having a tread engaging element and a pair of sidewall encircling elements attached to said tread engaging element and arms extending from said sidewall encircling elements having means to pivotally engage said pivot axles, said second U-shaped member having the second end of said traction chain attached thereto adjacent the juncture between said tread engaging elements and said arms, relative rotation of said second U-shaped member about said pivot axles tensioning said traction chain and providing an overcenter latch configuration securing said U-shaped member and said traction chain into operative position.

2. The apparatus of claim 1 wherein said arms are positioned substantially parallel to each other and extend perpendicular from each of said sidewall encircling members, said arms having a slot therein for engaging said pivot axles.

3. The apparatus of claim 1 and locking means to securely hold said U-shaped members together to prevent relative rotational movement therebetween when installed on a vehicle tire.

4. In a traction chain for vehicles, the improvement in the applying and fastening means comprising:
    a first substantially U-shaped member having a tread engaging element, a sidewall engaging element attached to each end of said tread engaging element, pivot axle means protruding from the outer surface of each of said sidewall engaging elements and chain attaching means attached to each of said sidewall engaging elements; and,
    a second U-shaped member having a tread engaging element, a sidewall encircling element attached to each end of said tread engaging element, means to attach said traction chain to each of said sidewall encircling elements, and pivot axle engaging means attached to each of said sidewall encircling elements, rotation of said second U-shaped member about said pivot axles with respect to said first U-shaped member tensioning said traction chain and providing an overcenter latch configuration between said first and said second U-shaped members when said traction chain encircles a vehicle tire.

5. The apparatus of claim 4 and locking means constructed and arranged to prevent relative rotation between said U-shaped members.

6. The apparatus of claim 5 wherein said locking means comprises an aperture on one of said U-shaped members engageable by a protrusion on the other of said U-shaped members.

7. Apparatus for applying and securing traction chains to a vehicle tire comprising:
- a first member adapted to partially encircle said tire on a diameter to provide a frictional contact with the sidewalls of said tire, the ends thereof having means to engage one end of the circumferentially extending elements of said traction chain, said first member carrying pivot means thereon and,
- a second member adapted to partially encircle said tire and to pivotally engage the pivot means carried by said first member, said second member carrying means to engage the other end of each of said circumferentially extending elements of said traction chain, said second member having a pair of substantially parallel arms extending substantially perpendicular to said second member at the terminal ends thereof, said arms having pivot engaging means thereon, said second member constructed and arranged so that rotation thereof about said pivot means causes tensioning of said traction chain about said vehicle tire and provides an overcenter latch relationship between said members when rotated into position against said tire.

8. The apparatus of claim 7 and locking means constructed and arranged to prevent relative rotation between said U-shaped members.

9. The apparatus of claim 8 wherein said locking means comprises an aperture on one of said U-shaped members engageable by a protrusion on the other of said U-shaped members.

* * * * *